United States Patent
Fujiwara et al.

(10) Patent No.: US 6,250,561 B1
(45) Date of Patent: Jun. 26, 2001

(54) VEHICLE HEAT GENERATOR

(75) Inventors: Yasuhiro Fujiwara; Takahiro Moroi; Hidefumi Mori; Masami Niwa, all of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/327,254

(22) Filed: Jun. 7, 1999

(30) Foreign Application Priority Data

Jun. 10, 1998 (JP) .................................................. 10-162010

(51) Int. Cl.$^7$ ...................................................... B60H 1/02
(52) U.S. Cl. ........................ 237/12.3 R; 122/26; 126/247
(58) Field of Search ........................ 237/12.3 B, 12.3 R; 122/26; 126/247; 123/142.5 R (56) References Cited

U.S. PATENT DOCUMENTS

| 4,277,010 |   | 7/1981  | Grenier .          |          |
|-----------|---|---------|--------------------|----------|
| 4,651,681 | * | 3/1987  | Perkins            | 122/26   |
| 4,781,151 | * | 11/1988 | Wolpert, Jr. et al.| 122/26   |
| 4,798,176 | * | 1/1989  | Perkins            | 122/26   |
| 4,974,778 |   | 12/1990 | Bertling .         |          |
| 4,993,377 | * | 2/1991  | Itakura            | 123/142.1 R |
| 5,332,367 | * | 7/1994  | Suzuki             | 417/286  |
| 5,743,467 | * | 4/1998  | Ban et al.         | 237/12.3 R |

FOREIGN PATENT DOCUMENTS

| 196 31 722 A1 | 2/1998  | (DE) | ................................ B60H/1/02 |
| 7-52722       | 12/1995 | (JP) . |                                      |
| 10-35259      | 2/1998  | (JP) . |                                      |

\* cited by examiner

*Primary Examiner*—Harold Joyce
*Assistant Examiner*—Derek S. Boles
(74) *Attorney, Agent, or Firm*—Morgan & Finnegan LLP (57) ABSTRACT

A vehicle heat generator, which can easily be installed in an engine room, includes a housing, and a heating chamber housed in the housing. The heating chamber contains viscous fluid. A heat transfer chamber is housed in the housing about the heating chamber. Circulating fluid flows through the heat transfer chamber. A rotor is rotatably supported in the heating chamber. The rotor shears the viscous fluid to generate heat. A flow passage of the circulating fluid is defined in the heat transfer chamber. The flow passage encompasses substantially the entire rotor. An ingoing passage connects the exterior of the housing to the flow passage. The circulating fluid flows through the ingoing passage from the exterior to the flow passage. An outgoing passage connects the flow passage to the exterior. The circulating fluid flows through the outgoing passage from the flow passage to the exterior. The ingoing passage and the outgoing passage extend substantially parallel to the rotor axis. The structure of the heat generator also facilitates movement of the viscous fluid in the heating chamber.

22 Claims, 4 Drawing Sheets

VEHICLE HEAT GENERATOR

BACKGROUND OF THE INVENTION

The present invention relates to a vehicle heat generator that generates heat by shearing viscous fluid with a rotor in a heating chamber and transferring the heat to a circulating fluid flowing through a heat transfer chamber. More particularly, the present invention pertains to an improvement in the flow passage of the circulating fluid.

Japanese Examined Utility Model Publication No. 7-52722 describes an auxiliary heater (heat generator), which is incorporated in a vehicle heater. The auxiliary heater includes a generally cylindrical casing (housing), which houses a cylindrical heating chamber. A plurality of outer plates are formed on the wall defining the heating chamber. A rotary shaft is rotatably supported in the heating chamber. A plurality of disc-like inner plates are fixed to the rotary shaft. Each outer plate is arranged between a corresponding pair of inner plates. That is, the inner and outer plates are arranged alternately. A viscous fluid is charged into the heating chamber such that the space between the inner and outer plates is filled with the viscous fluid. Furthermore, a coolant circuit (heat transfer chamber) extends about the heating chamber. A plurality of heat transfer fins extend along the coolant circuit.

The power of an engine is transmitted to the rotary shaft by way of an electromagnetic clutch to rotate the inner plates integrally with the rotary shaft. The rotating inner plates and the stationary outer plates shear the viscous fluid and generate heat. The fins transfer heat to an engine coolant (circulating fluid), which flows through the coolant circuit. The generated heat is used to warm the passenger compartment.

Japanese Unexamined Patent Publication No. 10-35259 describes a viscous fluid heater (heat generator) housing a heating chamber, which is defined by a cylindrical wall. A cylindrical rotor is rotatably supported in the heating chamber. A viscous fluid fills the clearance between the peripheral surface of the rotor and the cylindrical wall of the heating chamber. The viscous fluid is mainly sheared by the peripheral surface of the rotor to generate heat. A guide groove (transfer means) extends along the peripheral surface of the rotor. Rotation of the rotor forcibly moves the viscous fluid in the clearance along the guide groove toward one end of the rotor.

The coolant circuit of the auxiliary heater described in Japanese Examined Utility Model Publication No. 7-52722 forms part of a circuit that extends between the engine and a heater core. However, this publication does not discuss connection of the auxiliary heater to the other parts of the coolant circuit. An outlet pipe, through which coolant is discharged, extends radially from the front upper portion of the auxiliary heater, while an inlet pipe, through which coolant is drawn in, extends radially from the rear lower portion of the auxiliary heater. The radially extending outlet and inlet pipes restrict the layout of heater-related pipes in the engine room and thus complicate installation of the auxiliary heater in the engine room.

Further, the rotor of the auxiliary heater includes the rotary shaft and the disc-like inner plates, which are fixed to the rotary shaft. Although the rotor functions to shear the viscous fluid, the rotor does not function to move the viscous fluid in the heating chamber. However, in the viscous fluid heater of Japanese Unexamined Patent Publication No. 10-35259, rotation of the rotor moves the viscous fluid along the peripheral surface of the rotor.

Therefore, research has been carried out on rotor heat generators to control the movement of viscous fluid along the peripheral surface of the rotor by improving the circulating fluid flow passage that leads into and out of the heat transfer chamber.

SUMMARY OF THE INVENTION

Accordingly, it is an objective of the present invention to provide a vehicle heat generator that can easily be installed in vehicles and that improves the circulation of the viscous fluid in the heating chamber.

To achieve the above objective, the present invention provides a vehicle heat generator including a housing and a heating chamber housed in the housing. The heating chamber contains viscous fluid. A heat transfer chamber is housed in the housing about the heating chamber. Circulating fluid flows through the heat transfer chamber. A rotor is rotatably supported in the heating chamber. The rotor shears the viscous fluid to generate heat. A flow passage for the circulating fluid is defined in the transfer. chamber. The flow passage encompasses substantially the entire rotor. An ingoing passage connects the exterior of the housing to the flow passage. The circulating fluid flows from the exterior through the ingoing passage to the flow passage. An outgoing passage connects the flow passage to the housing exterior. The circulating fluid flows from the flow passage through the outgoing passage to the exterior. The ingoing passage and the outgoing passage extend substantially parallel to the rotor axis.

Other aspects and advantages of the present invention will become apparent from the following description, taken in conjunction with the accompanying drawings, illustrating by way of example the principles of the invention.

DETAILED DESCRIPTION OF THE PREFERRED EMBODIMENTS

A vehicle heat generator 100 will now be described with reference to the drawings.

Figure 1:
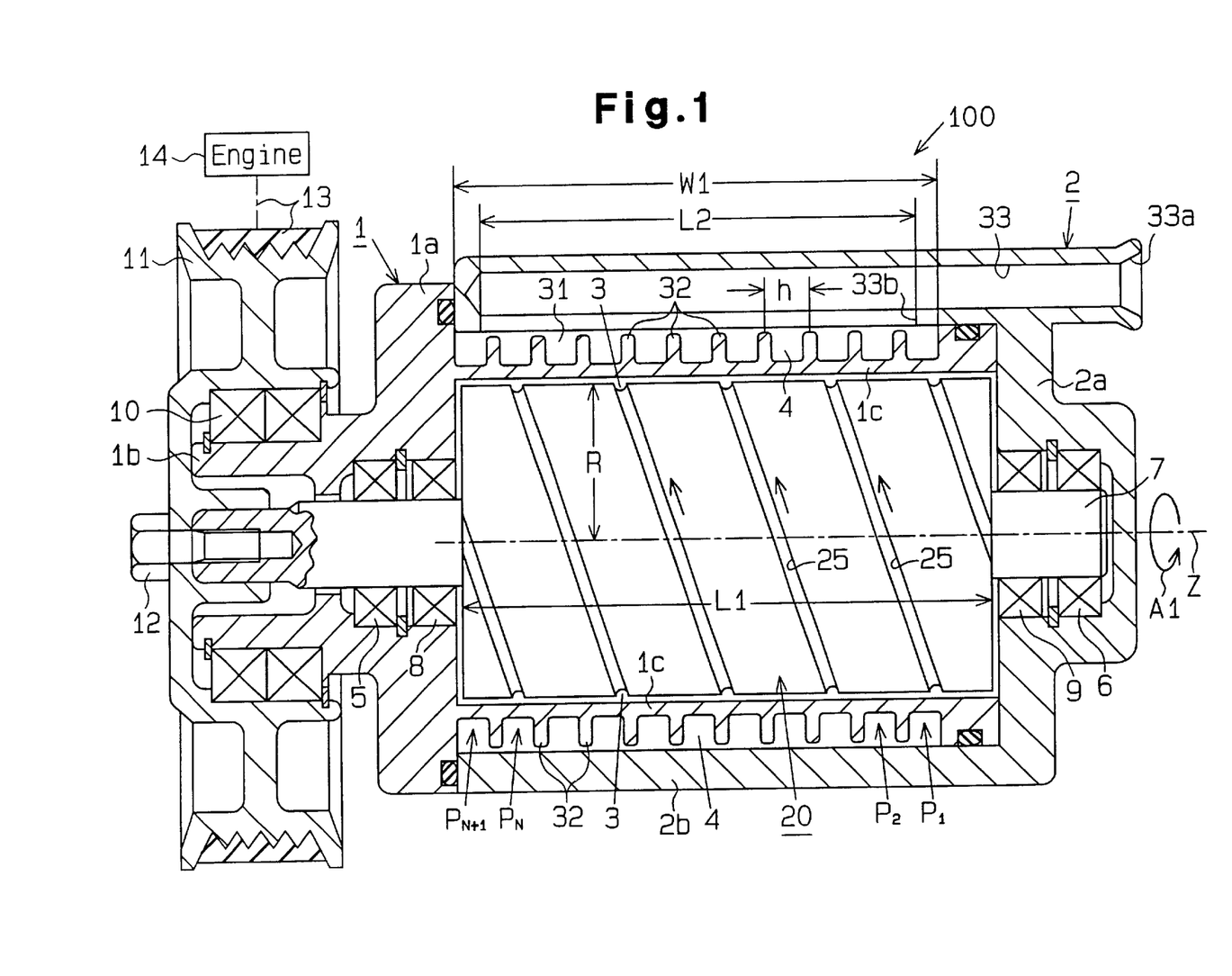
FIG. 1 is a cross-sectional view of a vehicle heat generator according to a first embodiment of the present invention.
Figure 2:
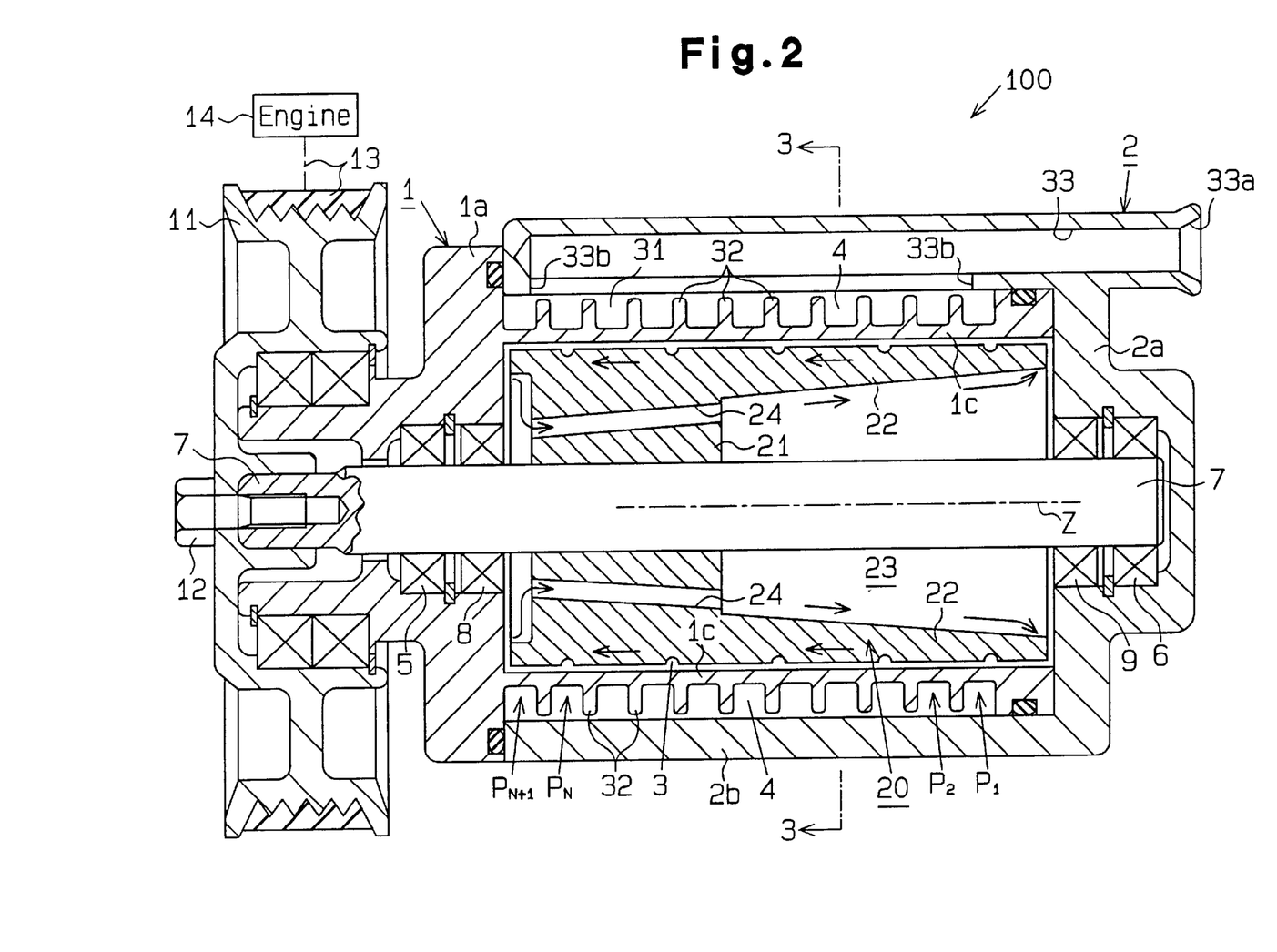
FIG. 2 is a cross-sectional view taken along line 2—2 in FIG. 3 and shows the interior of the rotor of the heat generator of FIG. 1.

The left side of the heat generator 100 is the front side, while the right side is the rear side, as viewed in FIGS. 1 and 2. As shown in FIGS. 1 and 2, the heat generator 100 includes a front housing 1 and a rear housing 2. The front housing 1 has a flange 1a, a boss 1b extending frontward from the flange 1a, and a cylinder 1c extending rearward from the flange 1a. The rear housing 2 has a disk-like plate 2a and a sleeve 2b extending frontward from the plate 2a.

Figure 3:
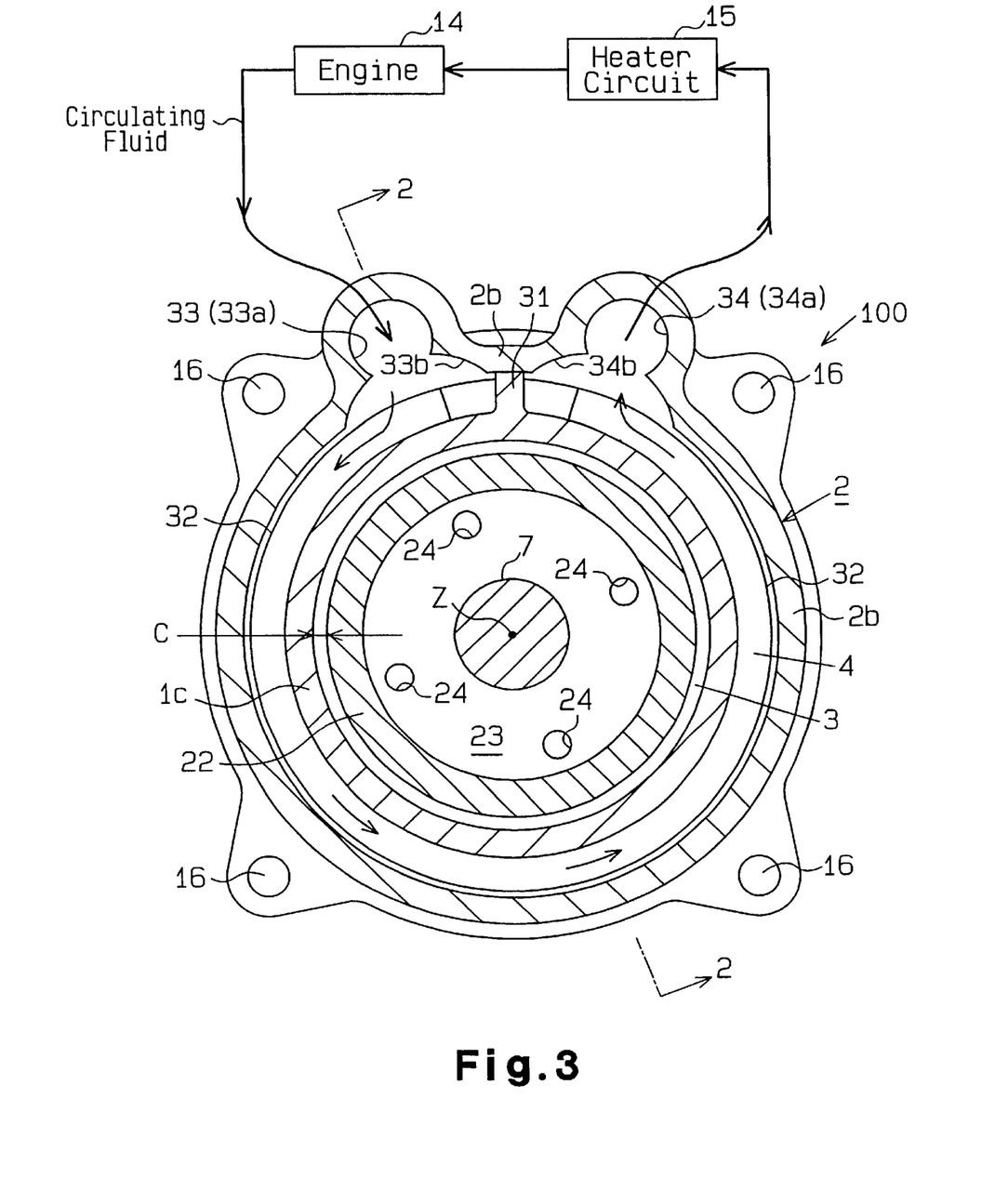
FIG. 3 is a cross-sectional view taken along line 3—3 in FIG. 2.

The front and rear housings 1, 2 are fastened to each other by a plurality of bolts 16 (FIG. 3). When the front and rear housings 1, 2 are fastened to each other, the cylinder 1c of the front housing 1 is pressed into the sleeve 2b of the rear housing 2. As a result, the rear end (right end as viewed in FIG. 1) of the cylinder 1c is pressed against the plate 2a of the rear housing 2. Furthermore, the front end (left end as viewed in FIG. 1) of the sleeve 2b of the rear housing 2 is pressed against the flange 1a of the front housing 1. Thus, the open end of the cylinder 1c is sealed by the rear housing plate 2a. This defines a heating chamber 3 in the cylinder 1c. A water jacket 4, which encompasses the heating chamber 3 and functions as a heat transfer chamber, is defined between the cylinder 1c of the front housing 1 and the sleeve 2b of the rear housing 2.

A drive shaft 7 is rotatably supported by bearings 5, 6 in the front and rear housings 1, 2. The front of the heating chamber 3 is sealed by a sealing member 8, while the rear of the heating chamber 3 is sealed by a sealing member 9. Thus, most of the drive shaft 7 is located in the sealed heating chamber 3.

As shown in FIG. 1, a rotor 20 is fixed to the drive shaft 7 in the heating chamber 3. The rotor 20 is generally cylindrical and made of an aluminum alloy. It is preferred that the axial length L1 of the rotor 20 be greater than the radius R of the rotor 20.

The heating chamber 3 is filled with a predetermined amount of silicone oil (not shown), which serves as a viscous fluid. Any medium that generates heat when the shearing effect of the rotor 20 produces fluid friction may be employed as the viscous fluid. Thus, the viscous fluid is not limited to liquids or semifluids that have high viscosity like silicone oil. The charged volume $V_f$ of the silicone oil is determined such that the effective volume $V_c$ of the heating chamber 3, which is obtained by subtracting the volume occupied by the drive shaft 7 and the rotor 20 from the total volume of the heating chamber 3, is in the range of 50% to 80% under normal temperatures ($V_f$=0.5$V_c$–0.8$V_c$). The charged volume is set lower than 100% to tolerate expansion of the silicone oil when heated. The silicone oil has a nominal viscosity of 10,000 cSt (centistokes) or more.

A pulley 11 is rotatably supported by a bearing 10 on the boss 1b of the housing 1. The pulley 11 is fixed to the front end (outer end) of the drive shaft 7 by a bolt 12. A belt 13 operably connects the pulley 11 to a vehicle engine 14 to transmit power. The power of the engine 14 transmitted by the belt 13 rotates the pulley 11, the drive shaft 7, and the rotor 20 integrally with one another. This shears the silicone oil contained in the annular clearance formed between the cylindrical surface of the rotor 20 and the wall of the heating chamber 3 (i.e., the inner surface of the cylinder 1c of the front housing 1) and generates heat. The heat of the silicone oil is then transferred to the coolant (circulating fluid) flowing through the water jacket 4. The heated coolant subsequently flows into a heater circuit 15 (FIG. 3) and warms the passenger compartment.

As shown in FIG. 2, the rotor 20 has a coupling portion 21, which is located near the flange 1a of the front housing 1 and fixed to the drive shaft 7, and a tubular portion 22, which extends toward the rear from the periphery part of the coupling portion 21. The tubular portion 22 extends about the axis Z of the rotor 20.

The inner surface of the tubular portion 22 is tapered such that its radius (or diameter) increases at positions closer to the rear end of the rotor 20. In other words, the inner surface of the rotor 20 is inclined relative to the rotor axis Z. The interior of the tubular portion 22 at the rear of the coupling portion 21 functions as a viscous fluid reservoir 23 in the rotor 20.

Communication passages 24 (four in this embodiment, as shown in FIG. 3) extend through the coupling portion 21 to connect the front side of the coupling portion 21 (i.e., the space between the front portion of the rotor 20 and the flange 1a of the front housing 1) and the rear side of the coupling portion 21 (i.e., the reservoir 23). Each communication passage 24 is inclined such that its front opening is near the drive shaft 7 and its rear opening is radially further from the drive shaft 7. In other words, each communication passage 24 is inclined relative to the rotor axis Z.

As shown in FIG. 1, a guide groove 25 extends helically along the cylindrical surface of the rotor 20 between the front and rear ends of the rotor 20. Although it is preferred that a single guide groove 25 be employed, more than one guide groove 25 may be formed along the peripheral surface of the tubular rotor 20. Rotation of the rotor in the direction depicted by arrow A1 forces the silicone oil in the annular clearance between the cylindrical surface of the rotor 20 and the wall of the heating chamber 3 to move from the rear end to the front end of the rotor 20. It is preferred that the clearance C (FIG. 3) between the cylindrical surface of the rotor 20 and the wall of the heating chamber 3 be within the range of several tens of micrometers to several hundreds of micrometers.

A partition 31 projects radially from the top of the front housing cylinder 1c, as viewed in FIG. 3. The partition 31 extends axially along most of the cylinder 1c. The top of the partition 31 contacts the inner surface of the rear housing sleeve 2b and separates the upper part of the water jacket 4 into two sections.

As shown in FIGS. 1 and 2, a plurality of guide fins 32 extend circumferentially along the cylindrical surface of the front housing cylinder 1c. The guide fins 32 are spaced equally from one another and guide the flow of the circulating fluid in the water jacket 4. Furthermore, the guide fins 32 form a circulating fluid flow passage in the water jacket 4 that extends almost completely about the rotor axis Z. The guide fins 32 divide the flow passage into a number of passageways (N+1), each passageway being represented by $P_1, P_2, \ldots, P_N, P_{N+1}$ (N represents the number of guide fins 32). In the embodiment of FIGS. 1 and 2, ten guide fins 32 are employed.

The height (projected radial distance) of each guide fin 32 is substantially equal to the gap h between adjacent guide fins 32 (FIG. 1). Therefore, the cross-sectional shape and area of the passageways $P_1$–$PN_1$ are substantially the same.

The total width W1 of the flow passage in the water jacket 4 (heat transfer chamber) is approximated by h×(N+1). Furthermore, the width W1 is set substantially equal to the length L1 of the rotor 20 (though, strictly, W1<L1). Each guide fin 32 functions to conduct heat and transfers the heat generated in the heating chamber 3 to the circulating fluid.

An ingoing passage 33 and an outgoing passage 34 extend through the upper portion of the rear housing sleeve 2b on opposite sides of the partition 31, as viewed in FIG. 3. As shown in FIGS. 2 and 3, the ingoing and outgoing passages 33, 34 are parallel to the axis Z of the rotor 20.

The ingoing passage 33 has an inlet 33a, which is opened toward the rear of the rear housing 2, and an axially extending opening 33b, through which the ingoing passage 33 is connected to the upstream portion of the flow passage. The circulating fluid from the engine 14 is drawn into the ingoing passage 33 through the inlet 33a and sent into the upstream portion of the flow passage through the opening 33b. The outgoing passage 34 has an outlet 34a, which is opened toward the rear of the rear housing 2, and an axially extending opening 34b, through which the outgoing passage 34 is connected to the downstream portion of the flow passage. After flowing through the water jacket 4, the circulating fluid enters the outgoing passage 34. The circulating fluid is then discharged from the outlet 34b and sent toward the heater circuit 15. The opening 33b of the ingoing passage 33 and the opening 34b of the outgoing passage 34 both have the same lengths (L2). The lengths L2 of the openings 33b, 34b are substantially the same as the total width W1 of the flow passage in the water jacket 4 (though, strictly, L2<W1).

As shown in FIG.3, the heat generator 100, the engine 14, and the heater circuit 15 are employed in a vehicle heater. The circulating fluid circulates through the heat generator 100, the engine 14, and the heater circuit 15. The heater circuit 15 includes a heater unit, which incorporates a heater core and other components. The heat generator 100 is installed in the engine room such that the drive shaft 7 and the rotor 20 extend horizontally and parallel to the ground.

The operation of the heat generator 100 will now be described. When the rotor 20 is not rotating, silicone oil settles to the lower portion of the heating chamber 3. Upon transmission of power from the engine 14, the pulley 11, the drive shaft 7, and the rotor 20 commence integral rotation. As a result, the viscosity of the silicone oil and the centrifugal force applied to the silicone oil causes the silicone oil in the reservoir 23 to be drawn into the annular clearance between the cylindrical surface of the rotor 20 and the wall of the heating chamber 3. Thus, the clearance is substantially filled with silicone oil within a short period of time. The silicone oil in the annular clearance is mechanically sheared and heated.

Rotation of the rotor 20 in direction A1 (FIG. 1) moves the silicone oil helically along the guide groove 25. Although the movement of the silicone oil takes place mainly in the guide groove 25, the silicone oil outside the groove 25 is also moved by the silicone oil in the groove 25. Therefore, the silicone oil outside the guide groove 25 also moves helically. Accordingly, a helical stream of the silicone oil moves the silicone oil along the rotor 20 from the rear to the front. In other words, the silicone oil in the annular clearance is moved forcibly along the rotor 20 from the rear to the front.

The guide effect of the guide groove 25 continuously sends the silicone oil in the annular clearance to the front of the rotor 20 (the narrow gap between the rotor 20 and the front housing 1). Thus, the force of the silicone oil causes the silicone oil collected in front of the rotor 20 to enter the communication passages 24. Since the communication passages 24 are inclined away from the drive shaft 7 at positions closer to the rear end of the rotor 20, the silicone oil in the communication passages 24 easily moves toward the reservoir 23 when the rotation of the rotor 20 generates centrifugal force. Centrifugal force then moves the silicone oil that enters the reservoir 23 toward the rear end of the rotor 20 along the tapered inner surface of the tubular portion 22. The silicone oil that reaches the rear end of the rotor 20 subsequently enters the annular clearance again.

Accordingly, the silicone oil in the heating chamber 3 is sheared and heated in the annular clearance during rotation of the rotor 20. In addition, the silicone oil continuously circulates between the annular clearance and the reservoir 23 during rotation of the rotor 20.

The heat generated in the annular clearance of the heating chamber 3 is transferred to the circulating fluid flowing through the passageways ($P_1$–$P_{N+1}$) in the water jacket 4. The lateral direction of the flow passage in the water jacket 4 coincides with the axial direction of the rotor 20. Furthermore, the opening 33b of the ingoing passage 33 and the opening 34b of the outgoing passage 34 extend in the lateral direction of the flow passage.

Figure 4:
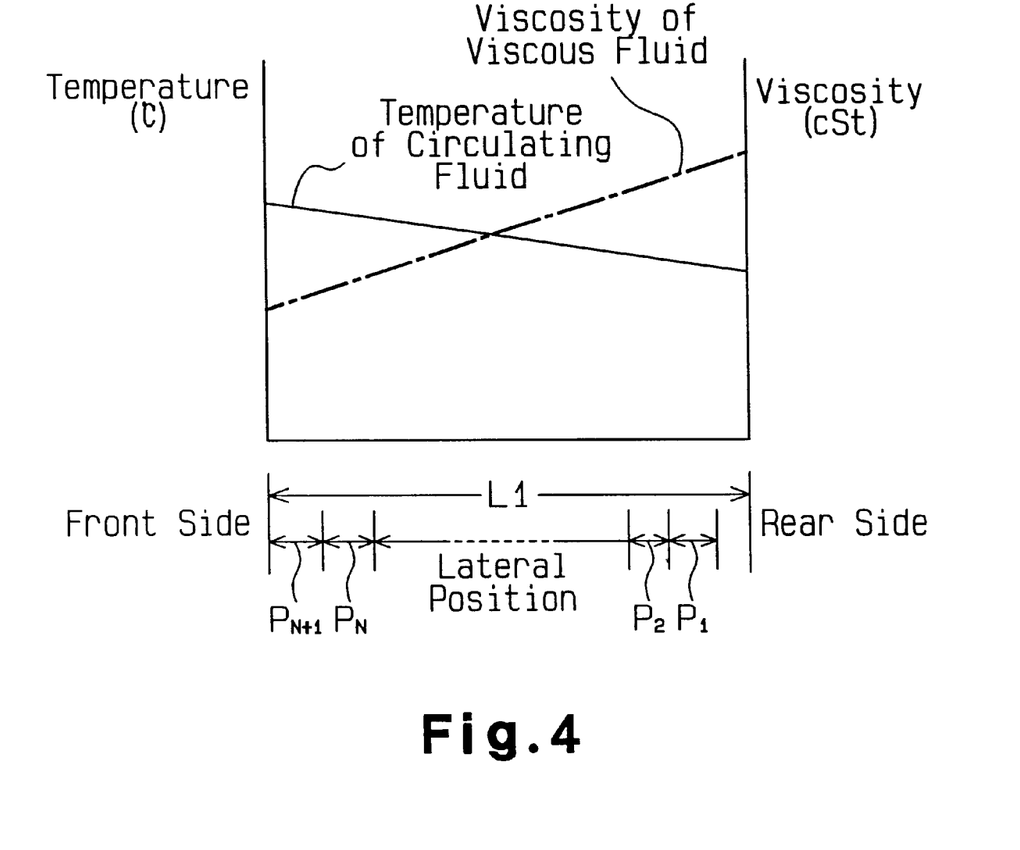
FIG. 4 is a graph showing the distribution of the circulating fluid temperature and the viscous fluid viscosity in the lateral direction of the fluid passage in the heat exchange chamber.

The temperature of the circulating fluid flowing through the rearmost passageway $P_1$ is lower than that of the circulating fluid flowing through the frontmost passageway $P_{N+1}$ (FIG. 4). This temperature difference occurs because the rearmost passageway $P_1$ is closer to the ingoing passage inlet 33a and the outgoing passage outlet 34a than the other passageways $P_{N+1}$. This increases the amount of circulating fluid flowing through the passageway $P_1$, which in turn, relatively increases the transfer of heat. On the other hand, the amount of circulating fluid flowing through the frontmost passageway $P_{N+1}$, which is farthest from the inlet 33a and the outlet 34a, is relatively small. This relatively decreases the amount of transferred heat.

The number of routes that the circulating coolant can take between the inlet 33a and the outlet 34a is the same as the number of the passageways (N+1). The passageway $P_1$ forms the shortest route, while the passageway $P_{N+1}$ farthest from the inlet 33a and the outlet 34a forms the longest route. A longer route increases the flow resistance and decreases the amount of the flowing circulating fluid. This relatively decreases the amount of transferred heat. Thus, the temperature distribution of the circulating fluid in passageways $P_1$–$P_{N+1}$ is proportional to that of the silicone oil at the corresponding locations in the clearance of the heating chamber 3.

The temperature of the silicone oil is inversely proportional to its viscosity. Thus, the viscosity distribution of the silicone oil is plotted by the broken line in the graph of FIG. 4. Therefore, the viscosity of the silicone oil in the annular clearance increases at positions closer to the rear end of the rotor 20 and decreases at positions closer to the front end of the rotor 20. This affects the moving characteristic of the silicone oil in the heating chamber 3.

If the guide groove 25 were eliminated from the cylindrical surface of the rotor 20 and ten guide fins 32 were formed along the outer surface of the front housing cylinder 1c to define eleven passageways, the sixth passageway $P_6$ would be located at the middle of the flow passage. In such case, the viscosity of the silicone oil in the clearance located rearward of the sixth passageway $P_6$ would be higher than that located frontward of the sixth passageway $P_6$. Thus, when the volume of the heated silicone oil expands at a position corresponding to the sixth passage $P_6$, the high viscosity silicone oil moves toward the low viscosity silicone oil. In other words, the silicone oil moves toward the front of the rotor 20 where the silicone oil moves more easily when heated.

This phenomenon takes place not only at the position corresponding to the sixth passage $P_6$ but also throughout the entire annular clearance. Accordingly, the viscosity distribution of the silicone oil heated in the annular clearance, which is shown in FIG. 4, compels the silicone oil to move from the rear toward the front of the rotor 20. That is, the viscosity difference of the silicone oil moves the oil in the same direction as the guide groove 25 does. Accordingly, the forcible movement of the silicone oil caused by the guide groove 25 is aided by the circulating fluid temperature distribution in the water jacket.

The preferred and illustrated embodiment has the advantages described below. During rotation of the rotor 20, the silicone oil in the heating chamber 3 circulates between the reservoir 23 and the annular clearance. This prevents the silicone oil from residing in the annular clearance, which is the main area where the oil is heated, for a long period of time. As a result, excessive local heating of the silicone oil, which may be caused when the silicone oil resides at the same location and is subjected to mechanical shearing over a long period of time, is avoided. This maintains the heating ability of the silicone oil and prolongs the life of the oil. Consequently, the heating capability of the heat generator 100 is maintained for a long time period.

The ingoing and outgoing passages 33, 34 of the circulating fluid are substantially parallel to the rotor axis Z. The passages 33, 34 are connected to the water jacket 4 by the openings 33b, 34b, respectively, such that the openings 33b, 34b span across substantially the full width (W1) of the water jacket 4. This results in the circulating fluid temperature distribution and silicone oil temperature distribution shown in FIG. 4. Accordingly, the forced movement of the silicone oil with the guide groove 25 is aided by the moving tendency of the silicone oil, which is caused by the viscosity and temperature distribution of the silicone oil. This circulates the viscous fluid smoothly in the heating chamber 3.

Furthermore, since the ingoing passage 33 and the outgoing passage 34 extend parallel to the rotor axis Z, the inlet 33a and the outlet 34a can be arranged next to each other facing the same direction (toward the rear of the rear housing 2). This reduces the layout limitations of the heat generator 100 in the engine room and facilitates the layout of the heater-related pipes. Accordingly, installation of the heat generator 100 is simplified.

The ingoing and outgoing passages 33, 34 are provided integrally with the rear housing 2. This reduces the number of components and simplifies the structure of the heat generator 100.

It should be apparent to those skilled in the art that the present invention may be embodied in many other specific forms without departing from the spirit or scope of the invention. Particularly, it should be understood that the present invention may be embodied in the following forms.

The preferred and illustrated embodiment may be modified by eliminating the guide fins 32. In such case, a circulating fluid temperature distribution and silicone oil viscosity distribution similar to that shown in FIG. 4 will still result as long as the ingoing and outgoing passages 33, 34 are connected to the water jacket 4 as described above.

In a further embodiment, the preferred and illustrated embodiment may be modified such that the guide fins 32 are formed on the inner surface of the rear housing sleeve 2b. The guide groove 25 may also be eliminated. Alternatively, the guide groove 25 may be replaced by a guide groove that extends along the wall encompassing the heating chamber 3. Such a guide groove would also move the viscous fluid. This is due to the narrow clearance C between the peripheral surface of the rotor 20 and the wall of the heating chamber 3. That is, the relative speed difference between the peripheral surface of the rotor 20 and the wall of the heating chamber 3 is the same regardless of whether the guide groove extends along the rotor peripheral surface or the chamber wall. As another option, guide grooves may be formed on both the rotor peripheral surface and the heating chamber wall.

The present examples and embodiments are to be considered as illustrative and not restrictive, and the invention is not to be limited to the details given herein, but may be modified within the scope and equivalence of the appended claims.

What is claimed is:

1. A vehicle heat generator comprising:
    a housing;
    a heating chamber housed in the housing, wherein the heating chamber contains viscous fluid;
    a heat transfer chamber housed in the housing about the heating chamber, wherein circulating fluid flows through the heat transfer chamber;
    a rotor rotatably supported in the heating chamber, wherein the rotor shears the viscous fluid to generate heat;
    a flow passage for the circulating fluid in the heat transfer chamber, wherein the flow passage encompasses substantially the entire rotor;
    an ingoing passage connecting the exterior of the housing to the flow passage, wherein the ingoing passage extends substantially parallel to the rotor axis, and wherein the circulating fluid flows from the exterior through the ingoing passage to the flow passage;
    an outgoing passage connecting the flow passage to the housing exterior, wherein the outgoing passage extends substantially parallel to the rotor axis, and wherein the circulating fluid flows from the flow passage through the outgoing passage to the exterior, wherein the flow passage has a width that is substantially equal to the length of the ingoing and outgoing passages, the flow passage having an upstream portion joined to the ingoing passage and a downstream portion joined to the outgoing passage, wherein substantially the full width of the upstream portion is opened to the ingoing passage, and substantially the full width of the downstream portion is opened to the outgoing passage.

2. The heat generator according to claim 1, wherein the width of the flow passage is substantially the same as the axial length of the rotor.

3. A vehicle heat generator comprising:
    a housing;
    a heating chamber housed in the housing, wherein the heating chamber contains viscous fluid;
    a heat transfer chamber housed in the housing about the heating chamber, wherein circulating fluid flows through the heat transfer chamber;
    a rotor rotatable supported in the heating chamber, wherein the rotor shears the viscous fluid to generate heat;
    a flow passage for the circulating fluid in the heat transfer chamber, wherein the flow passage encompasses substantially the entire rotor;
    a guide arranged in the flow passage to guide the circulating fluid circumferentially about the rotor, wherein the guide includes a plurality of equally spaced fins, the fins being substantially perpendicular to the rotor axis;
    an ingoing passage connecting the exterior of the housing to the flow passage, wherein the ingoing passage extends substantially parallel to the rotor axis, and wherein the circulating fluid flows from the exterior through the ingoing passage to the flow passage; and
    an outgoing passage connecting the flow passage to the housing exterior, wherein the outgoing passage extends substantially parallel to the rotor axis, and wherein the circulating fluid flows from the flow passage through the outgoing passage to the exterior.

4. The heat generator according to claim 2, wherein the ingoing and outgoing passages are integral with the housing.

5. A vehicle heat generator comprising:
    a housing;
    a heating chamber housed in the housing, wherein the heating chamber contains viscous fluid, wherein the heating chamber has a wall;
    a heat transfer chamber housed in the housing about the heating chamber, wherein circulating fluid through the heat transfer chamber;

a rotor rotatably supported in the heating chamber, wherein the rotor shears the viscous fluid to generate heat, wherein the rotor is generally cylindrical, the rotor surface and the opposing heating chamber wall defining an annular space therebetween;

a flow passage for the circulating fluid in the heat transfer chamber, wherein the flow passage encompasses substantially the entire rotor;

an ingoing passage connecting the exterior of the housing to the flow passage, wherein the ingoing passage extends substantially parallel to the rotor axis, and wherein the circulating fluid flows from the exterior through the ingoing passage to the flow passage;

an outgoing passage connecting the flow passage to the housing exterior, wherein the outgoing passage extends substantially parallel to the rotor axis, and wherein the circulating fluid flows from the flow passage through the outgoing passage to the exterior.

6. The heat generator according to claim 5 further comprising an additional guide for moving the viscous fluid toward one end of the rotor, wherein the additional guide is arranged on either the cylindrical rotor surface or the heating chamber wall.

7. The heat generator according to claim 6, wherein the flow direction of the circulating fluid in the ingoing passage is the same as that in which the additional guide moves the viscous fluid, and wherein the flow direction of the circulating fluid in the outgoing passage is opposite to that of the ingoing passage.

8. The heat generator according to claim 6, wherein the additional guide includes a helical groove extending along the surface of the rotor.

9. The heat generator according to claim 5, wherein the rotor has a reservoir for reserving viscous fluid therein and a communication passage connecting the reservoir to one end of the rotor.

10. The heat generator according to claim 5, wherein the rotor has a tubular portion, the thickness of the tubular portion increasing toward one end of the rotor.

11. The heat generator according to claim 5, wherein the rotor has a diameter that is less than the axial length of the rotor.

12. A vehicle heat generator comprising:

a housing;

a heating chamber housed in the housing, wherein the heating chamber contains viscous fluid, wherein the viscous fluid has a nominal viscosity of 10,000 centistokes or more;

a heat transfer chamber housed in the housing about the heating chamber, wherein circulating fluid flows through the heat transfer chamber;

a rotor rotatably supported in the heating chamber, wherein the rotor shears the viscous fluid to generate heat;

a flow passage for the circulating fluid in the heat transfer chamber, wherein the flow passage encompasses substantially the entire rotor;

an ingoing passage connecting the exterior of the housing to the flow passage, wherein the ingoing passage extends substantially parallel to the rotor axis, and wherein the circulating fluid flows from the exterior through the ingoing passage to the flow passage;

an outgoing passage connecting the flow passage to the housing exterior, wherein the outgoing passage extends substantially parallel to the rotor axis, and wherein the circulating fluid flows from the flow passage through the outgoing passage to the exterior.

13. A vehicle heat generator comprising:

a housing;

a heating chamber housed in the housing, wherein the heating chamber contains viscous fluid, wherein the heating chamber has a wall and the rotor is generally cylindrical, the rotor surface and the opposing heating chamber wall defining an annular space therebetween;

a heat transfer chamber housed in the housing about the heating chamber, wherein circulating fluid flows through the heat transfer chamber;

a rotor rotatably supported in the heating chamber, wherein the rotor shears the viscous fluid to generate heat;

a flow passage for the circulating fluid in the heat transfer chamber, wherein the flow passage encompasses substantially the entire rotor, wherein the flow passage has a width that is substantially equal to the length of the ingoing and outgoing passages, the flow passage having an upstream portion joined to the ingoing passage and a downstream portion joined to the outgoing passage, wherein substantially the full width of the upstream portion is opened to the ingoing passage, and substantially the full width of the downstream portion is opened to the outgoing passage;

an ingoing passage connecting the exterior of the housing to the flow passage, wherein the ingoing passage extends substantially parallel to the rotor axis, and wherein the circulating fluid flows from the exterior through the ingoing passage to the flow passage;

an outgoing passage connecting the flow passage to the housing exterior, wherein the outgoing passage extends substantially parallel to the rotor axis, and wherein the circulating fluid flows from the flow passage through the outgoing passage to the exterior.

14. The heat generator according to claim 13, wherein the width of the flow passage is substantially the same as the axial length of the rotor.

15. The heat generator according to claim 13, wherein the ingoing and outgoing passages are integral with the housing.

16. The heat generator according to claim 13 further comprising a guide arranged in the flow passage to guide the circulating fluid circumferentially about the rotor.

17. The heat generator according to claim 16 further comprising an additional guide for moving the viscous fluid toward one end of the rotor, wherein the additional guide is arranged on either the cylindrical rotor surface or the heating chamber wall.

18. The heat generator according to claim 17, wherein the flow direction of the circulating fluid in the ingoing passage is the same as that in which the additional guide moves the viscous fluid, and wherein the flow direction of the circulating fluid in the outgoing passage is opposite to that of the ingoing passage.

19. The heat generator according to claim 17, wherein the additional guide includes a helical groove extending along the surface of the rotor.

20. The heat generator according to claim 13, wherein the rotor has a reservoir for reserving viscous fluid therein and a communication passage connecting the reservoir to one end of the rotor.

21. The heat generator according to claim 13, wherein the rotor has a tubular portion, the thickness of the tubular portion increasing toward one end of the rotor.

22. The heat generator according to claim 13, wherein the rotor has a diameter that is less than the axial length of the rotor.

* * * * *

UNITED STATES PATENT AND TRADEMARK OFFICE
CERTIFICATE OF CORRECTION

PATENT NO. : 6,250,561 B1
DATED : June 26, 2001
INVENTOR(S) : Yasuhiro Fujiwara et al.

It is certified that error appears in the above-identified patent and that said Letters Patent is hereby corrected as shown below:

Title page,
Item [56], References Cited, please change "4,277,010  7/1981  Grenier" to
-- 4,277,020    7/1981  Grenier --.

Signed and Sealed this

Seventh Day of May, 2002

Attest:

JAMES E. ROGAN
*Attesting Officer*    *Director of the United States Patent and Trademark Office*